United States Patent
Wu et al.

(10) Patent No.: US 9,218,419 B2
(45) Date of Patent: Dec. 22, 2015

(54) SNAPSHOT GENERATION FOR SEARCH RESULTS PAGE PREVIEW

(75) Inventors: Hui Wu, Fremont, CA (US); Shenhong Zhu, Santa Clara, CA (US); Xiangli Kong, Beijing (CN); Hang Su, Sunnyvale, CA (US); Xiaobing Han, San Jose, CA (US); Zhongqiang Chen, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 278 days.

(21) Appl. No.: 13/452,985

(22) Filed: Apr. 23, 2012

(65) Prior Publication Data

US 2013/0283140 A1   Oct. 24, 2013

(51) Int. Cl.
*G06F 17/00* (2006.01)
*G06F 17/30* (2006.01)

(52) U.S. Cl.
CPC .......... *G06F 17/30864* (2013.01); *G06F 17/30* (2013.01)

(58) Field of Classification Search
CPC ................................ G06F 17/00; G06F 17/30
USPC ................................................ 715/205, 207
See application file for complete search history.

(56) References Cited

U.S. PATENT DOCUMENTS

| | | | | |
|---|---|---|---|---|
| 6,643,641 | B1* | 11/2003 | Snyder | 707/709 |
| 7,412,650 | B2* | 8/2008 | Gallo | 715/700 |
| RE42,413 | E * | 5/2011 | Snyder | 707/802 |
| 7,996,395 | B2* | 8/2011 | Li et al. | 707/723 |
| 8,250,067 | B2* | 8/2012 | Li et al. | 707/723 |
| 8,538,943 | B1* | 9/2013 | Bau et al. | 707/706 |
| 2002/0163546 | A1* | 11/2002 | Gallo | 345/848 |
| 2008/0256051 | A1* | 10/2008 | Liu et al. | 707/5 |
| 2010/0036878 | A1* | 2/2010 | Kim | 707/104.1 |
| 2010/0223257 | A1* | 9/2010 | Milic-Frayling et al. | 707/722 |
| 2011/0317022 | A1* | 12/2011 | Cao | 348/207.11 |
| 2012/0076414 | A1* | 3/2012 | Xu et al. | 382/176 |
| 2012/0131441 | A1* | 5/2012 | Jitkoff et al. | 715/234 |
| 2012/0136756 | A1* | 5/2012 | Jitkoff et al. | 705/27.1 |
| 2013/0018912 | A1* | 1/2013 | Bao et al. | 707/769 |
| 2013/0124968 | A1* | 5/2013 | Dontcheva et al. | 715/234 |
| 2013/0144861 | A1* | 6/2013 | Bennett | 707/710 |
| 2013/0239212 | A1* | 9/2013 | Bennett | 726/22 |

* cited by examiner

*Primary Examiner* — Stephen Hong
*Assistant Examiner* — Marshon Robinson
(74) *Attorney, Agent, or Firm* — Pillsbury Winthrop Shaw Pittman LLP

(57) ABSTRACT

Methods, systems, and programming for providing web page snapshots are disclosed. A URL is received. A snapshot of the web page associated with the URL is generated. A plurality of features is extracted from the snapshot. A determination is made regarding whether the snapshot is high quality based on the plurality of extracted features of the snapshot. The generated snapshot is provided as a viewable and actionable link to the URL.

18 Claims, 19 Drawing Sheets

SNAPSHOT GENERATION FOR SEARCH RESULTS PAGE PREVIEW

FIELD

The present disclosure relates to methods, systems and programming for generating web pages snapshots and evaluating web page snapshot quality. More particularly, the present disclosure is directed to methods, systems, and programming for providing high quality web page snapshots for search results.

BACKGROUND OF THE INVENTION

When users of web search engines or browsers enter search requests, snapshots corresponding to the web pages of the search requests may be produced. However, it is often the case that the snapshots do not offer useful information and do not reflect the contents of the original web pages. In certain circumstances, the snapshots themselves may be low quality images or simply snapshots of error pages due to certain web pages being removed, or being under maintenance. Thus, when users view these results, they may not see results that produce web pages that can be navigated to for useful information. Additionally, users may need to spend time sifting through results to find results with snapshots that are useable and offer useful information.

SUMMARY

The embodiments described herein relate to methods, systems, and programming for generating web page snapshots and evaluating web page snapshot quality. More particularly, the present disclosure is directed to methods, systems, and programming for providing high quality web page snapshots for search results.

In an embodiment a method implemented on at least one computing device, each computing device having at least one processor, storage, and a communication platform connected to a network for providing web page snapshots, is disclosed. A URL is received. A snapshot of the web page associated with the URL is generated. A plurality of features is extracted from the snapshot. A determination is made regarding whether the snapshot is high quality based on the plurality of extracted features of the snapshot. The created snapshot is provided as a viewable and actionable link to the URL.

In another embodiment, generating a snapshot of the web page associated with the URL comprises: detecting whether the web page associated with the URL includes an error; and storing the URL in a failed URL database if the web page associated with the URL includes an error.

In another embodiment, extracting a plurality of features from the snapshot comprises: analyzing the snapshot to extract features related to a color distribution of the snapshot; and analyzing the snapshot to extract features related to a web page title and snapshot size of the snapshot. Analyzing the snapshot to extract features related to a color distribution of the snapshot comprises: partitioning the snapshot into a plurality of grids; and determining features based on a color distribution of each of the plurality of grids. Determining features based on a color distribution of each of the plurality of grids comprises: determining feature combinations of adjacent grids of the plurality of grids.

In another embodiment, testing the plurality of extracted features of the snapshot comprises: comparing the plurality of extracted features of the snapshot with a model. The model is generated by receiving a plurality of training data, extracting features from the plurality of training data, scoring the extracted features to generate a training feature set, and generating the model using the training feature set.

In an embodiment, a system providing web page snapshots is disclosed. The system includes a snapshot generator for generating a snapshot of the web page associated with a received URL, a feature extractor for extracting a plurality of features from the snapshot, a testing unit for determining whether the snapshot is a high quality snapshot based on testing the plurality of extracted features of the snapshot, and a snapshot repository for providing the snapshot as a viewable and actionable link to the URL.

In another embodiment, the snapshot generator detects whether the web page associated with the URL includes an error, and stores the URL in a failed URL database if the URL includes an error.

In another embodiment, the feature extractor analyzes the snapshot to extract features related to a color distribution of the snapshot. The feature extractor may further analyze the snapshot to extract features related to a web page title and snapshot size of the snapshot. The feature extractor may further partition the snapshot into a plurality of grids and determine features based on a color distribution of each of the plurality of grids. The feature extractor may further determine feature combinations of adjacent grids of the plurality of grids.

In another embodiment, the testing unit is configured to compare the plurality of extracted features of the snapshot with a model.

In another embodiment, the system further includes a model generator for receiving a plurality of training data, extracting features from the plurality of training data, scoring the extracted features to generate a training feature set, and generating the model using the training feature set.

Other concepts relate to software for implementing adaptive application searching. A software product, in accord with this concept, includes at least one machine-readable non-transitory medium and information carried by the medium. The information carried by the medium may be executable program code data regarding parameters in association with a request or operational parameters.

In an embodiment, a machine readable and non-transitory medium having information recorded thereon for providing web page snapshots, where when the information is read by the machine, causes the machine to receive a URL, generate a snapshot of the web page associated with the URL, extract a plurality of features from the snapshot, determine whether the snapshot is a high quality snapshot based on the plurality of extracted features of the snapshot, and provide the snapshot as a viewable and actionable link to the URL.

In another embodiment, generating a snapshot of the web page associated with the URL comprises: detecting whether the web page associated with the URL includes an error; and storing the URL in a failed URL database if the web page associated with the URL includes an error.

In another embodiment, extracting a plurality of features from the snapshot comprises: analyzing the snapshot to extract features related to a color distribution of the snapshot; and analyzing the snapshot to extract features related to a web page title and snapshot size of the snapshot. Analyzing the snapshot to extract features related to a color distribution of the snapshot comprises: partitioning the snapshot into a plurality of grids; and determining features based on a color distribution of each of the plurality of grids. Determining features based on a color distribution of each of the plurality of grids comprises: determining feature combinations of adjacent grids of the plurality of grids.

In another embodiment, testing the plurality of extracted features of the snapshot comprises: comparing the plurality of extracted features of the snapshot with a model. The model is generated by receiving a plurality of training data, extracting features from the plurality of training data, scoring the extracted features to generate a training feature set, and generating the model using the training feature set.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

DETAILED DESCRIPTION

In the following detailed description, numerous specific details are set forth by way of example in order to provide a thorough understanding of the relevant embodiments described herein. However, it should be apparent to those skilled in the art that the present embodiments may be practiced without such details. In other instances, well known methods, procedures, components and/or circuitry have been described at a relatively high-level, without detail, in order to avoid unnecessarily obscuring aspects of the embodiments described herein.

The present disclosure relates to methods, systems and programming for generating web pages snapshots and evaluating web page snapshot quality. More particularly, the present disclosure is directed to methods, systems, and programming for providing high quality web page snapshots for search results. Web page snapshot quality may be evaluated in order to ensure that high quality web page snapshots are provided to users for viewing based on their search results. The web page snapshots are also actionable since each snapshot links to a corresponding to a web page URL. In classifying whether a web page snapshot is high quality, classification techniques are used to extract features of web pages, taking into account Hypertext Transfer Protocol (HTTP) responses, web page source code, and snapshot color distribution.

Figure 1:
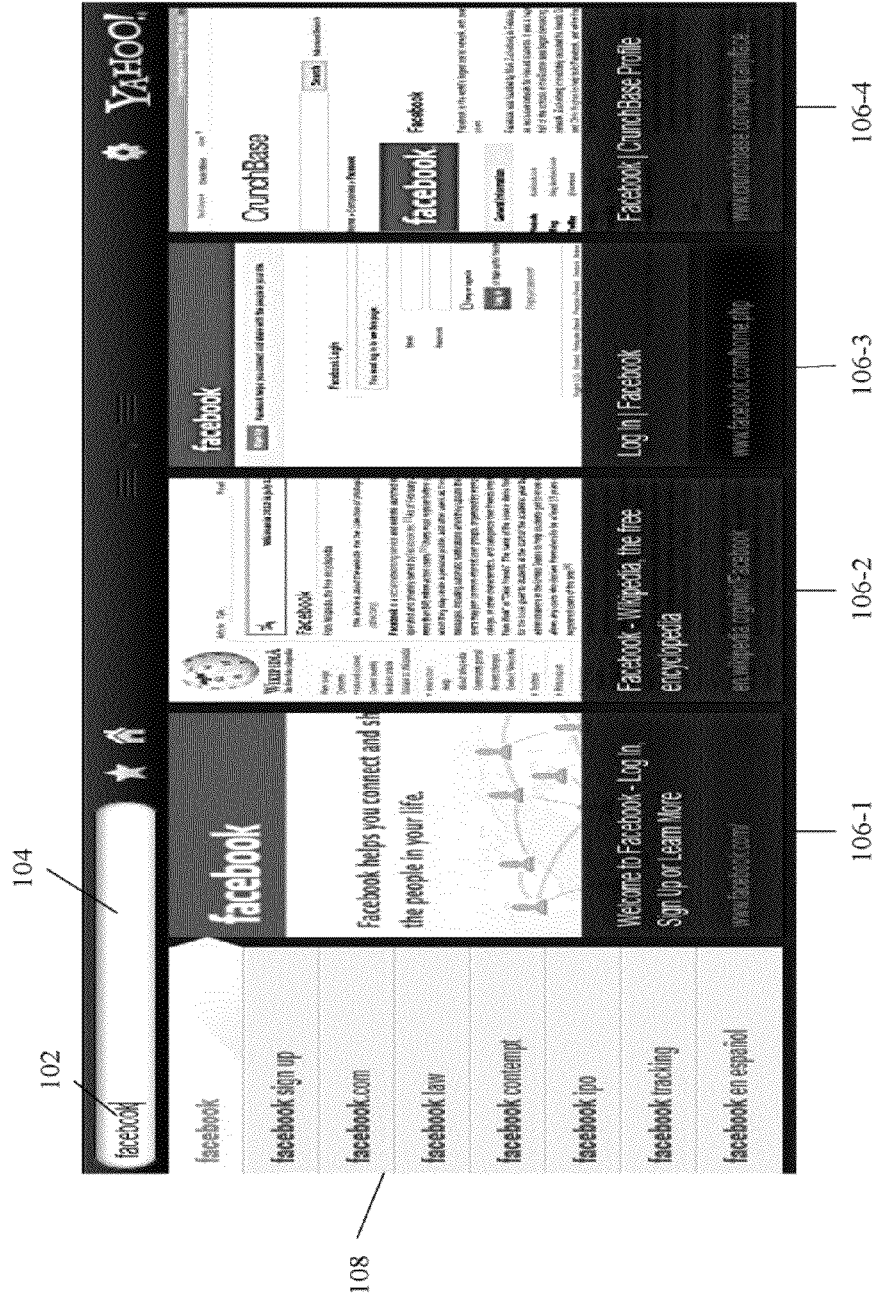
FIG. 1 depicts an exemplary view of search results including web page snapshots, in accordance with an embodiment of the present disclosure.

FIG. 1 depicts an exemplary view of search results including web page snapshots, in accordance with an embodiment of the present disclosure. A search query 102 is entered into search query box 104. The search query "facebook" has resulted in snapshots 106-1-106-4 appearing in the search results 108. Search results 108 may be shown in an entire browser window, or may comprise a preview of search results that only consumes a portion of a browser window. Snapshots 106-1-106-4 correspond to the search results for search query 102. Each snapshot of 106-1-106-4 is viewable to show a web page, and also actionable to link a browser to a web page uniform resource locator (URL) corresponding to the snapshot. For example, if snapshot 106-1 is selected, clicked, or activated, this will cause a browser environment or other platform or program capable of viewing a web site to navigate to "www.facebook.com" which is the web page URL corresponding to snapshot 106-1. Providing users the ability to view the snapshots as results of a search query allows users to quickly, and visually device, based on the snapshots of web pages, which results may be most relevant to their entered search query. Snapshots 106-1-106-4 are also displayed because they have been deemed high quality snapshots. Also included is a query suggestion box 108. Query suggestion box suggests other relevant queries based on the search query 102 entered into search query box 104. Additionally, as search query 102 is updated, either by deletion or addition of text, query suggestion box 108 and snapshots 106-1-106-4 may update in real time in response to the change in search query 102.

A high quality snapshot may be considered to satisfy two basic requirements: 1) the snapshot should offer useful information to a user; and 2) the snapshot should reflect the appropriate contents of the web page to which it corresponds. Low quality snapshots, which are shown by FIGS. 2, 3, and 4, represent snapshots which should not be shown as search results.

Figure 2:
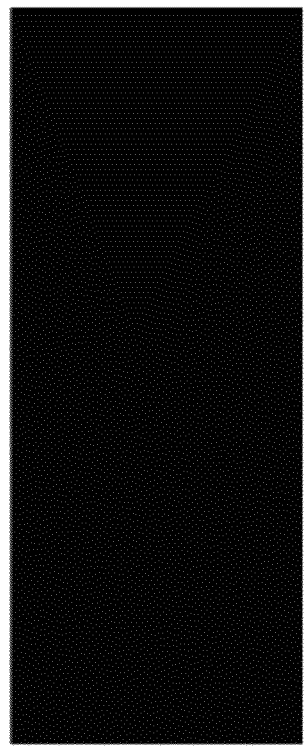
FIG. 2 depicts an exemplary low quality web page snapshot in accordance with an embodiment of the present disclosure.

FIG. 2 depicts an exemplary low quality web page snapshot in accordance with an embodiment of the present disclosure. Snapshot 202 depicts a snapshot of a webpage URL that has a 404 error. A 404 error indicates that a web server could not find the web page URL that has been requested. This means that a client request made to a web server is acknowledged because the server is active, but the web page URL that the client has requested cannot be retrieved by the server.

Figure 3:
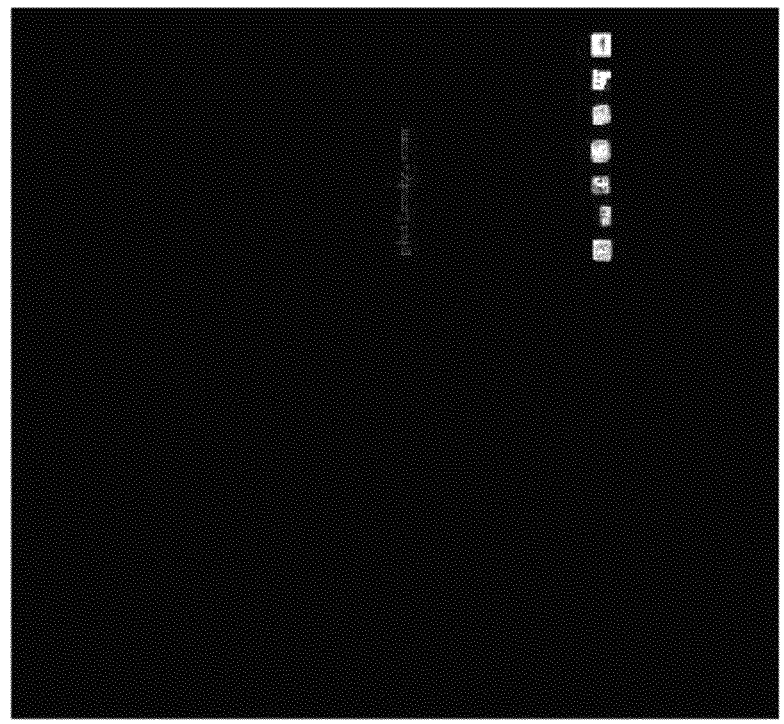
FIG. 3 depicts an exemplary low quality web page snapshot in accordance with an embodiment of the present disclosure.

FIG. 3 depicts an exemplary low quality web page snapshot in accordance with an embodiment of the present disclosure. Snapshot 302 depicts a snapshot of a webpage URL that only has partial content. For reasons ranging from an incomplete web page to poor network conditions, certain snapshots, such as snapshot 302 represent partial content web pages which do not reflect the precise contents of the actual web page URL.

Figure 4:
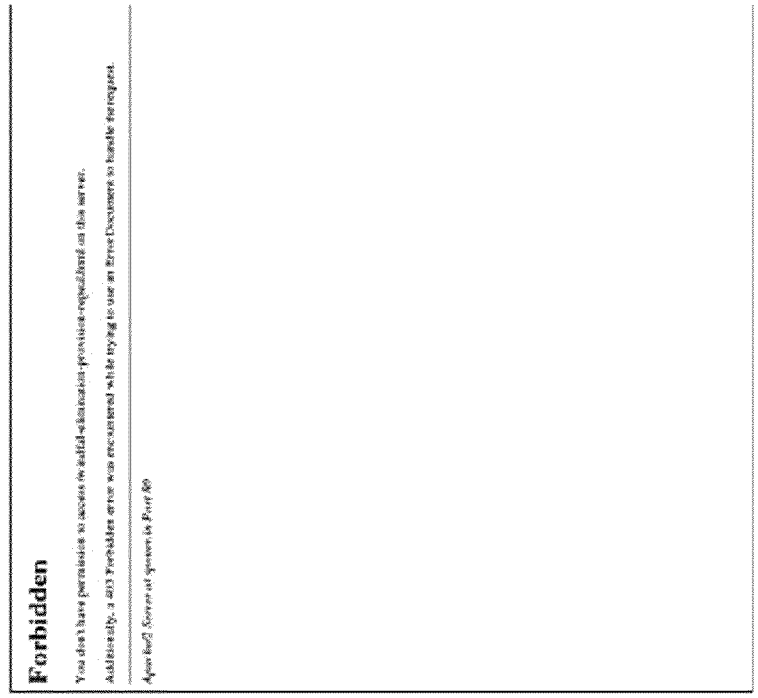
FIG. 4 depicts an exemplary low quality web page snapshot in accordance with an embodiment of the present disclosure.

FIG. 4 depicts an exemplary low quality web page snapshot in accordance with an embodiment of the present disclosure. Snapshot 402 depicts a snapshot of a webpage URL that has a 403 error. A 403 error indicates that the webpage URL that a client is attempting to access is forbidden. Generally, this means that the client does not have the proper credentials to access the webpage URL, or the site is down for maintenance.

Thus, FIGS. 2 and 4 depict snapshots that do not offer any useful information to users because if a user sees snapshots such as these, they cannot discern anything about the web page URL. Additionally, as these snapshots show that a web page URL has a 404 or 403 error, if these snapshots are shown as search results, a user will have no use for these since clicking on these snapshots will not bring them to a navigable web page. FIG. 3, does not reflect the contents of the web page URL precisely because only part of the page is visible. These types of snapshots are not useful as search results and should be removed from search results that show web page snapshots.

Figure 5:
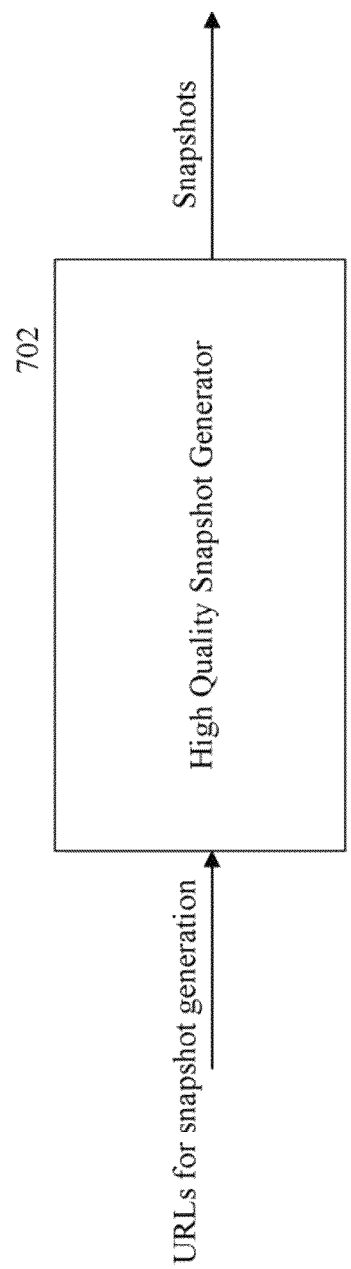
FIG. 5 depicts inputs and outputs of a high quality snapshot generator in accordance to an embodiment of the present disclosure.

FIG. 5 depicts inputs and outputs of a high quality snapshot generator in accordance to an embodiment of the present disclosure. High quality snapshot generator 702 receives as input, a plurality of URLs for snapshot generation. The plurality of URLs represent web page URLs that high quality snapshot generator 702 will generate snapshots of. Of the generated snapshots, high quality snapshot generator 702 will select the snapshots that pass a threshold test with the help of the model shown in FIG. 6 and mark them as high quality snapshots. The high quality snapshots are output by high quality snapshot generator 702 and may be stored for retrieval as search results when needed.

Figure 6:
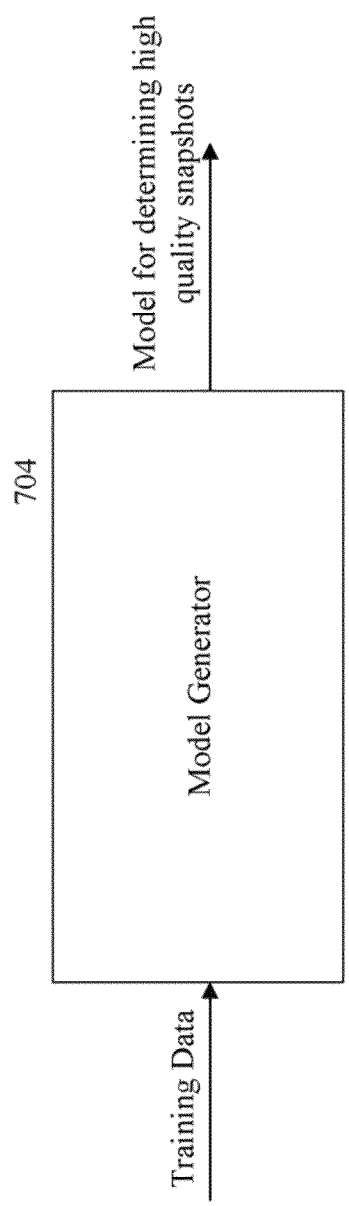
FIG. 6 depicts inputs and outputs of a model generator in accordance to an embodiment of the present disclosure.

FIG. 6 depicts inputs and outputs of a model generator in accordance to an embodiment of the present disclosure. Model generator 704 receives as input a set of training data that are labeled raw snapshots and titles of their corresponding web pages. This set of training data is processed by model generator 704 to produce a model to be used for determining high quality snapshots. This model is used by high quality snapshot generator 702 to determine the qualities of snapshots.

Figure 7:
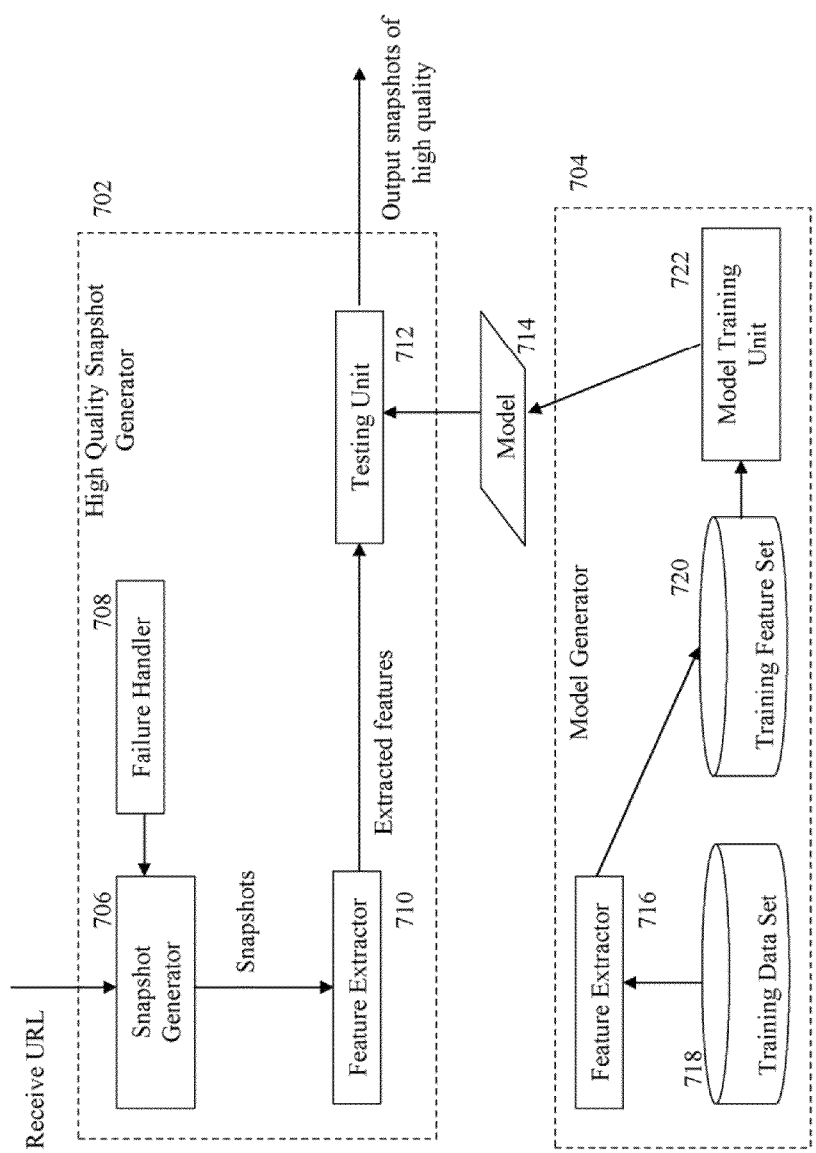
FIG. 7 depicts a high level exemplary system diagram of a high quality snapshot generator and a model generator in accordance with an embodiment of the present disclosure.

FIG. 7 depicts a high level exemplary system diagram of a high quality snapshot generator and a model generator in accordance with an embodiment of the present disclosure. As discussed above, high quality snapshot generator 702 receives URLs for snapshot generation and outputs high quality snapshots. Model generator 704 receives training data which is processed to generate a model used by high quality snapshot generator 702 to determine which snapshots are high quality snapshots. FIG. 7 is meant to show the interconnection between high quality snapshot generator 702 and model generator 704, and how they are both used to facilitate the generation of high quality snapshots that may be retrieved as search results.

Web page URLs are received by snapshot generator 706 of high quality snapshot generator 702. Snapshot generator 706 attempts to generate a snapshot of each of the web page URLs. Failure handler 708 processes any web page URLs that encounter errors during snapshot generation. For instance, failure handler 708 may detect that a web page URL is subject to, for example, an HTTP 404 error, HTTP 403 error, or a connection timeout. Failure handler 708 adaptively reacts to different types of errors detected. For example, when an HTTP 404 or HTTP 403 error is detected in a URL, failure handler 708 transmits an instruction to snapshot generator 706 to skip generation of a snapshot for that particular web page URL. If a connection timeout is detected, failure handler 708 may transmit an instruction to snapshot generator 706 to retry generation of a snapshot for that particular web page URL a predetermined number of times. If the snapshot still cannot be taken, failure handler 708 will instruct snapshot generator 706 to skip generation of a snapshot as well. All web page URLs that have been skipped are forwarded by failure handler 708 to a failed snapshot repository (not shown).

All snapshots that are successfully generated by snapshot generator 706 are forwarded to feature extractor 710, where certain features of each snapshot and each web page URL associated with each snapshot are extracted. Features to be extracted for testing include web page titles, snapshot file sizes, and color distribution information of the snapshots. A more detailed description of feature extraction is provided in the paragraphs below.

All extracted features of each snapshot are forwarded to testing unit 712. Testing unit 712 uses a trained model 714 to analyze the extracted features of each snapshot and make a determination of which snapshots qualify as high quality snapshots. These high quality snapshots are output by high quality snapshot generator 702 to a snapshot repository (not shown). Snapshot repository stores the high quality snapshots so that the high quality snapshots may be retrieved and presented as search results that are both viewable and actionable.

Model 714 is generated by model generator 704. Model generator 704 represents a training system that uses raw training snapshots of web page URLS, including web page title information, to generate a model 714 that may be used by high quality snapshot generator 702 to determine which snapshots qualify as high quality snapshots. Model generator 704 includes a feature extractor 716, which receives as input, a set of raw training data and corresponding web page titles from training data set 718. Feature extractor 716 operates similarly to feature extractor 710 discussed above. Thus, feature extractor 716 extracts web page titles, snapshot file sizes, and color distributions of snapshots from the training data set 718. The features extracted by feature extractor 716 are output as a training feature set 720. The features in training feature set 720, which represent ground truth results, are scored by model training unit 722. Based on the scoring of the features from training feature set 720, model training unit 722 is able to generate model 714. Trained model 714 may then be used by high quality snapshot generator 702 to accurately and reliably determine the quality of snapshots.

Figure 8:
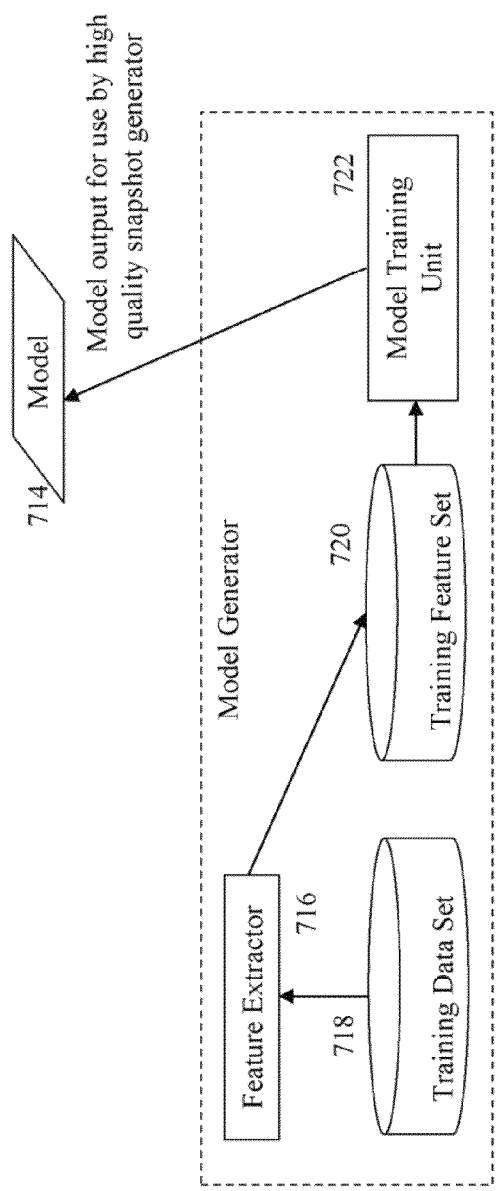
FIG. 8 depicts a high level exemplary system diagram of a model generator in accordance with an embodiment of the present disclosure.

FIG. 8 depicts a high level exemplary system diagram of a model generator in accordance with an embodiment of the present disclosure. FIG. 8 depicts a standalone high level exemplary system diagram of model generator 704 as described above. Model generator 704 is responsible for outputting model 714, which is used by high quality snapshot generator 702 to accurately and reliably determine which web page snapshots are high quality and suitable for display. Feature extractor 716 receives raw training snapshots of web pages as well as web page titles associated with the raw training snapshots. The raw training snapshots and titles are received from training data set 718. Feature extractor 716 then extracts features based on analysis of the raw training snapshots and their associated web page titles to determine which features may be indicative of snapshot's quality. These indicative features of snapshots are chosen to form feature vectors for the training snapshots. The constructed feature vectors are then provided as training feature set 720 to model training unit 722. Model training unit 722 analyzes and processes the training feature set 720 to generate a trained model 714 which is essentially a summary of the feature vectors for data points from training data set 718 and output from model generator 704. Trained model 714 represents a model having features for use by high quality snapshot generator 702 to compare with other snapshots in determining if these snapshots are high quality and worthy of display as a search result. Machine learning algorithms can be used to generate the model. Some machine learning algorithms include support vector machine, gradient boosting decision tree, k-nearest neighbor, and self-organized map.

Figure 9:
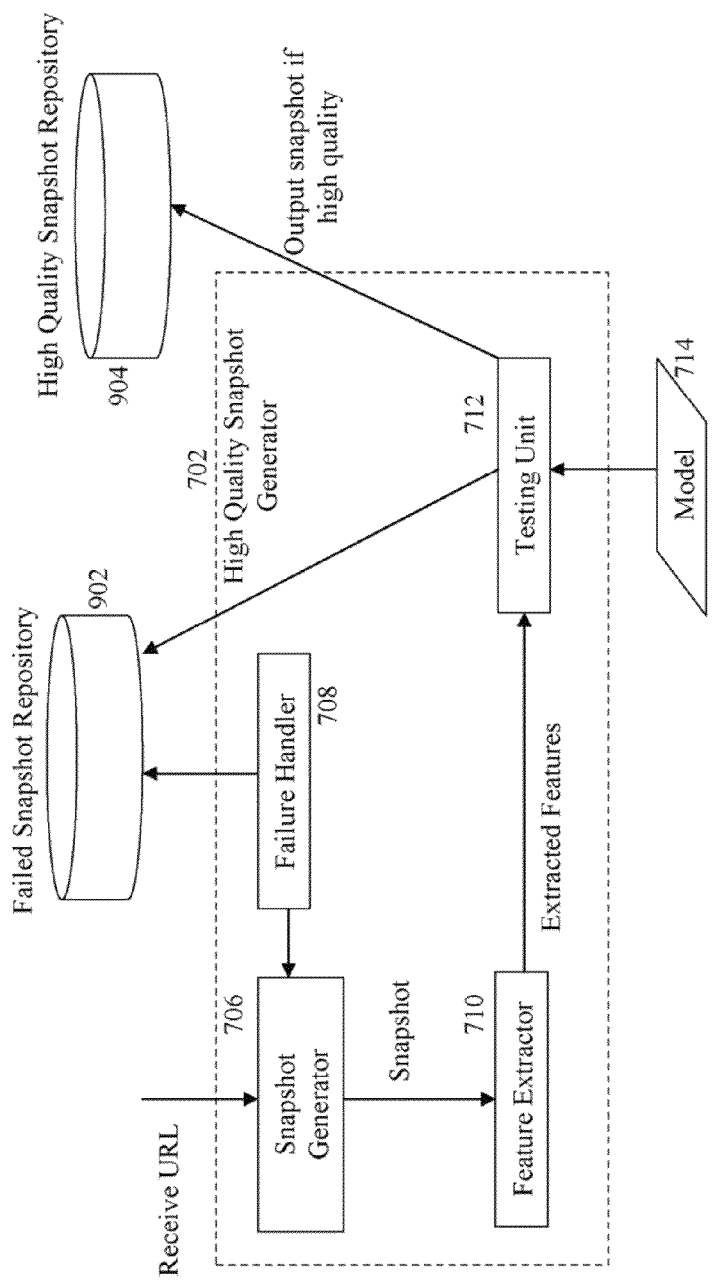
FIG. 9 depicts a high level exemplary system diagram of a high quality snapshot generator in accordance with an embodiment of the present disclosure.

FIG. 9 depicts a high level exemplary system diagram of a high quality snapshot generator in accordance with an embodiment of the present disclosure. High quality snapshot generator 702 receives a web page URL as an input. Snapshot generator 706 attempts to generate a snapshot of the web page associated with the web page URL. Failure handler 708 processes the web page URL if an error is encountered during generation of a snapshot of the web page associated with the web page URL. For instance, failure handler 708 may detect that the web page URL is subject to, for example, an HTTP 404 error, HTTP 403 error, or a connection timeout. The errors may be detected by monitoring the behavior of Web servers, parsing web page returned from Web servers, or analyzing the snapshot generated by snapshot generator 702. Errors may occur for a variety of reasons, including a web server corresponding to a given URL being down, a web server that is overloaded with traffic, a temporary failure of the web servers policies, and network connectivity issues in general. Failure handler 708 adaptively reacts to different types of errors detected. For example, when an HTTP 404 or HTTP 403 error is detected in a URL, failure handler 708 transmits an instruction to snapshot generator 706 to skip generation of a snapshot for that particular web page URL. If a connection timeout is detected, failure handler 708 may transmit an instruction to snapshot generator 706 to retry generation of a snapshot for that particular web page URL a predetermined number of times. If the snapshot still cannot be taken, failure handler 708 will instruct snapshot generator 706 to skip generation of a snapshot. If the web page URL is skipped, that web page URL is forwarded by failure handler 708 to a failed snapshot repository 902. All web page URLs stored in failed snapshot repository 902 are re-input to snapshot generator 702 periodically to reattempt snapshot generation. This ensures that web pages that are temporarily taken down for maintenance, suffering from denial of service attacks, or simply not able to load properly will not be removed from search results indefinitely.

The title of the web page corresponding to the web page URL may also be extracted by failure handler 708. Errors may be detected based on the web page title, if, for example, the title reads: Page not found, Authentication fail, Forbidden, No title. Measures based on pattern matching or similarity algorithms may be employed to detect the titles indicative of errors. The size of the web page snapshot may also be used. For example, if a web page snapshot is small in terms of data storage size or the web page URL is associated with a title that signifies an error, that web page URL may be flagged as having an error. A size threshold for snapshot may be derived automatically from training data or set manually, for example, a threshold of 4 kilobytes can be used for a snapshot having a dimension of 324×439 in a JPEG format. If the snapshot size is less than the threshold or the title signifies an error, the web page URL would be sent to failed snapshot repository 902.

All snapshots that are successfully generated by snapshot generator 706 are forwarded to feature extractor 710, where certain features of the snapshot and the web page URL associated with the snapshot are extracted. Features to be extracted for testing include the web page title, snapshot file size, and color distribution information of the snapshot. If the web page title and the snapshot file size do not indicate an error, then the color distribution information of the snapshot is analyzed. Analysis of the color distribution of each snapshot is discussed with respect to FIGS. 10 through 13.

All extracted features of the snapshot are forwarded to testing unit 712. Testing unit 712 uses trained model 714 to analyze the extracted features of the snapshot to compare with features of trained model 714 in determining whether the snapshot is a high quality snapshot. For instance, a similarity between the snapshot and each of the data points in the trained model 714 are computed, and this may be used as the basis for deciding if the snapshot is a high quality snapshot or not. If the snapshot is determined to be a high quality snapshot, the snapshot and corresponding web page URL are transmitted to high quality snapshot repository 904 for storage. High quality snapshot repository 904 stores the high quality snapshots so that the high quality snapshots may be retrieved and presented as search results that are both viewable and actionable. If the snapshot is determined to be low quality, then the snapshot and web page URL are transmitted to failed snapshot repository 902.

Figure 10:
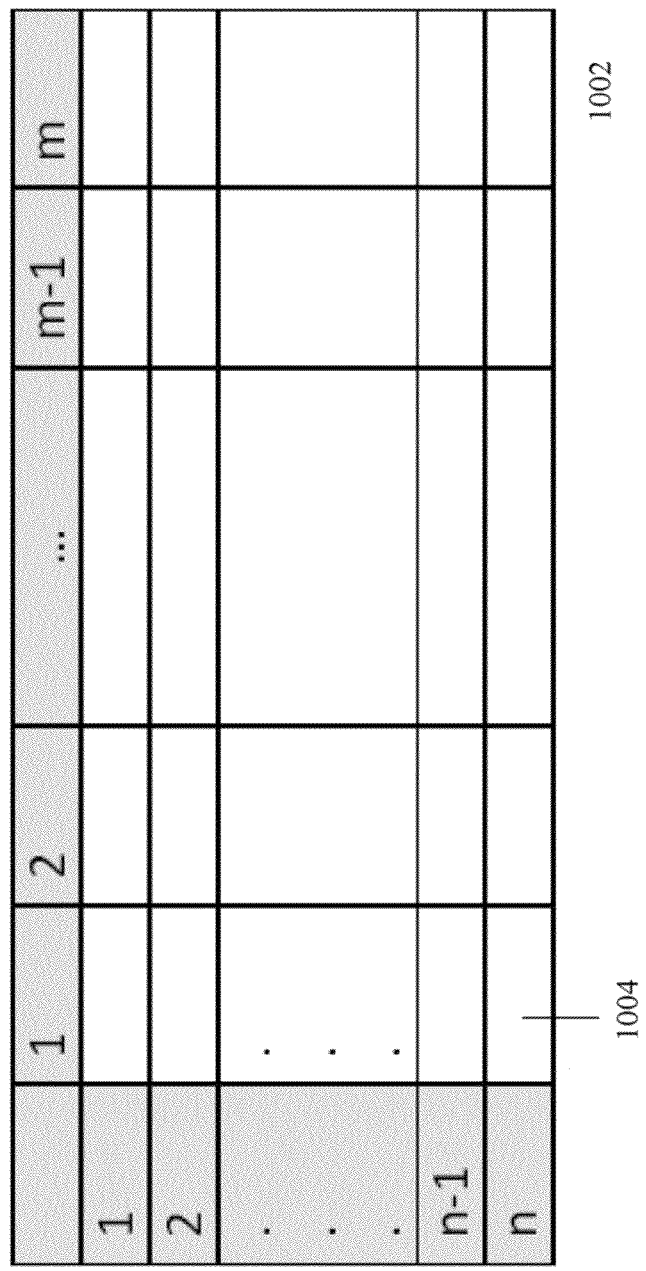
FIG. 10 depicts a diagram of a snapshot partition used by a feature extractor to determine features of a snapshot in accordance with an embodiment of the present disclosure.

FIG. 10 depicts a diagram of a snapshot partition used by a feature extractor to determine features of a snapshot in accordance with an embodiment of the present disclosure. Each pixel in any given snapshot of a web page associated with a web page URL is formed by three basic colors: red, green, and blue. To reduce the dimensions of feature vectors, each snapshot may be partitioned as an array of cells shown by FIG. 10. A snapshot may be partitioned into a grid of m*n partitions (or cells). Each partition of the grid 1002 includes color-related features and values. For example, if grid 1002 is a m*n grid of cells with 4×4 pixels in each cell, every pixel of a cell in grid 1002, such as cell 1004, is represented by a <red, green, blue> vector. Thus, each cell has its own color vector formed by value distribution over 16 pixels.

Intra-cell features are determined in order to define and compute features to be used to determine if the snapshot is a high quality snapshot. Intra-cell features such as the average color values, minimum color values, maximum color values, and variance of color values of each pixel's red, green, and blue color values can be calculated. The number of edges in each cell may also be determined.

Inter-cell features may also be determined in order to define and compute features to be used to determine if the snapshot is a high quality snapshot. Inter-cell features such as average distance in color values (red, green, blue) to a neighbor, minimum distance in color values to a neighbor, maximum distance in a color value to a neighbor, and variance of distance in color values to a neighbor can be calculated.

Figure 11:
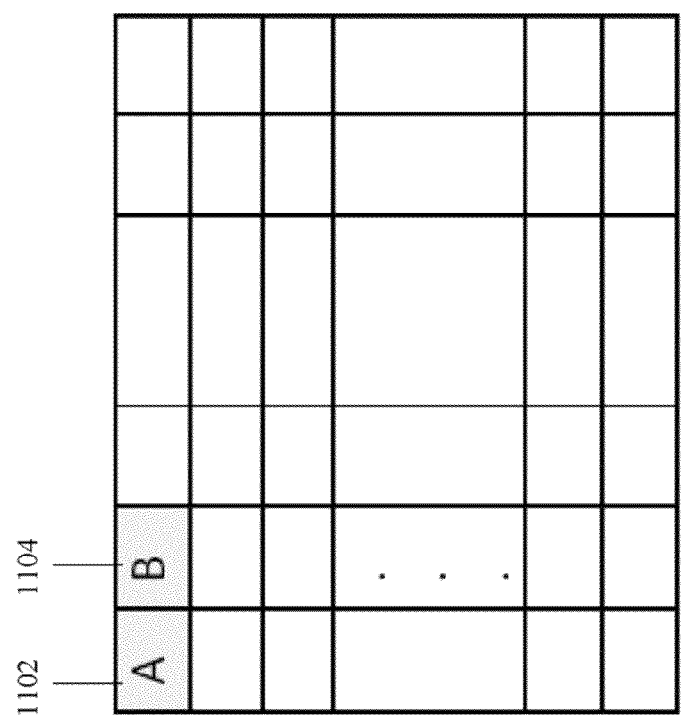
FIG. 11 depicts a two neighbor feature combination in accordance with an embodiment of the present disclosure.
Figure 12:
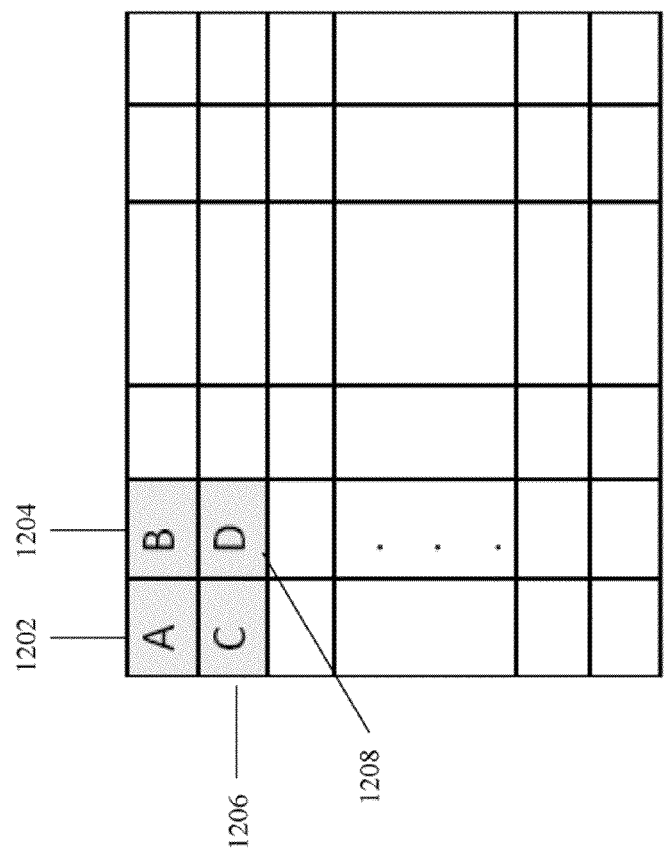
FIG. 12 depicts a square-neighbor combination in accordance with an embodiment of the present disclosure.
Figure 13:
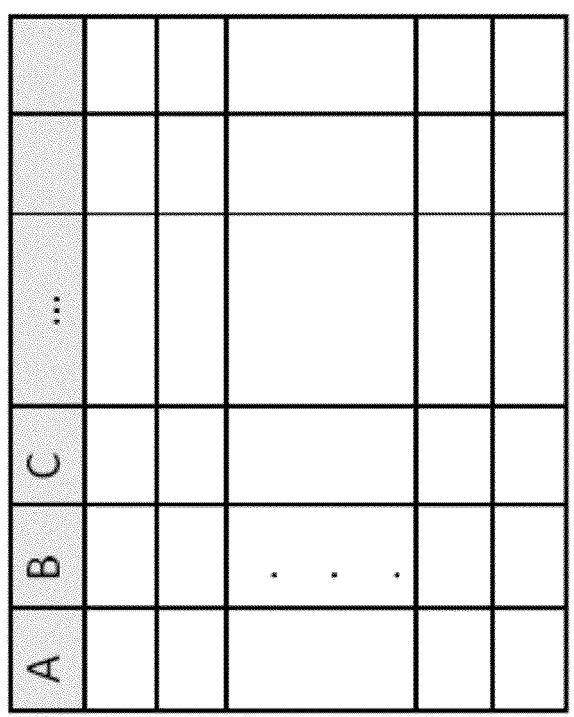
FIG. 13 depicts a one-line combination in accordance with an embodiment of the present disclosure.

Features may be generated by combining features. FIGS. 11 through 13 show some examples.

FIG. 11 depicts a two neighbor feature combination in accordance with an embodiment of the present disclosure. Two pixels 1102 and 1104 are used to generate a two neighbor feature combination. The aforementioned intra-cell and inter-cell features may be calculated for this two neighbor combination.

FIG. 12 depicts a square-neighbor combination in accordance with an embodiment of the present disclosure. Four pixels 1202, 1204, 1206, and 1208 are used to generate a square-neighbor feature combination. The aforementioned intra-cell and inter-cell features may be calculated for this square-neighbor feature combination.

FIG. 13 depicts a one-line combination in accordance with an embodiment of the present disclosure. A single line of pixels 1302 is used to generate a one-line feature combination. The aforementioned intra-cell and inter-cell features may be calculated for this one-line feature combination.

Figure 14:
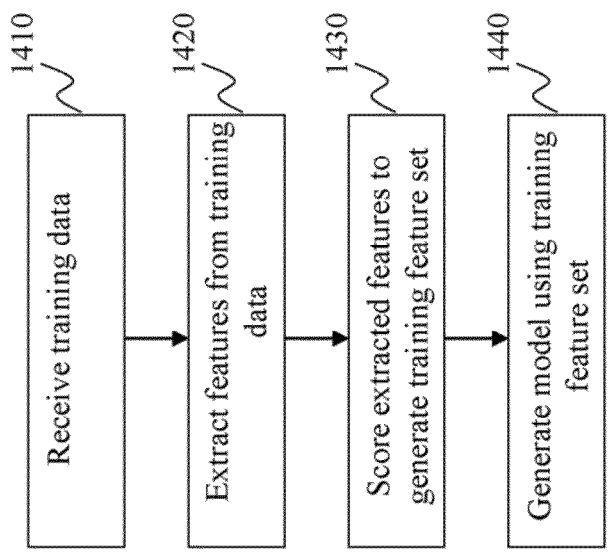
FIG. 14 depicts a flowchart of an exemplary process in which a model generator generates a model in accordance with an embodiment of the present disclosure.

FIG. 14 depicts a flowchart of an exemplary process in which a model generator generates a model in accordance with an embodiment of the present disclosure. At 1410, model generator 704 receives a plurality of training data. This training data may be retrieved from a training data set including training data such as training set 718, or as a result of input from a different system or in response to a user request. The input comprises training data that may be used by model generator 704 to produce a trained model 714 for usage by high quality snapshot generator 702 to determine whether web page URL snapshots are considered high quality for usage as search results. The training data itself includes labeled web page snapshots and associated information such as titles of the web page URLs that the web page snapshots correspond to.

At 1420, features are extracted from the plurality of training data. Feature extraction is performed by feature extractor 716 of model generator 704. Features to be extracted for testing include the web page title, snapshot file size, and color distribution information of each of the plurality of training data. If the web page title and the snapshot file size do not indicate an error, then the color distribution information of the snapshot is analyzed.

At 1430, once the features are extracted, feature extractor 716 scores the extracted features to determine which features are most relevant to determination of a high quality snapshot. The extracted features, now associated with scores, form a training feature set 720 that may be used for generation of trained model 714.

At 1440, the model is generated using the training feature set. Model training unit 722 of model generator 704 generates trained model 714 using training feature set 720. Once trained model 714 is output by model generator 704, trained model 714 is ready for usage by high quality snapshot generator 702 to compare features of trained model 714 with generated snapshots associated with web page URLs to determine if the snapshots are high quality and should be stored for usage as search results.

Figure 15:
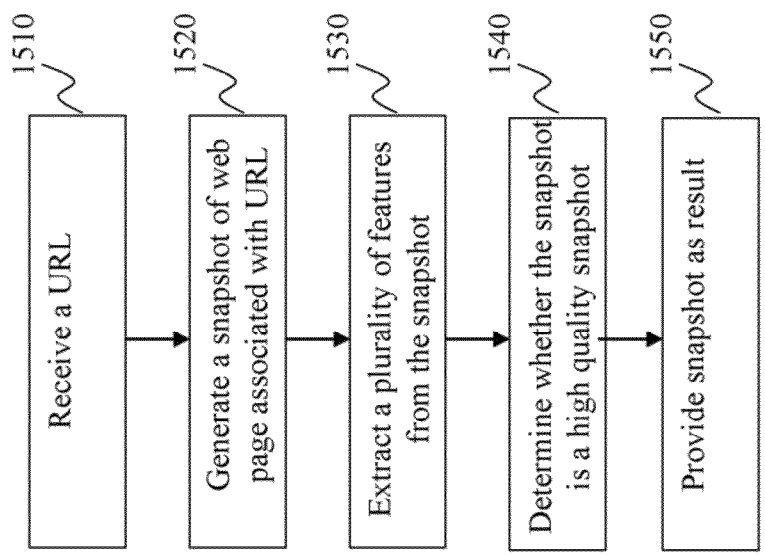
FIG. 15 depicts a flowchart of an exemplary process in which a high quality snapshot generator determines whether web page snapshots are high quality snapshots in accordance with an embodiment of the present disclosure.

FIG. 15 depicts a flowchart of an exemplary process in which a high quality snapshot generator determines whether web page snapshots are high quality snapshots in accordance with an embodiment of the present disclosure. At 1510, a web page URL is received by high quality snapshot generator 702.

High quality snapshot generator is configured to receive a plurality of web page URLs at periodic intervals in order to process the web page URLs. Processing the web page URLs includes generating snapshots of the web page associated with each web page URL, extracting features from those snapshots, and then determining if the snapshots are high quality to provide as search results in response to user search engine search queries.

At 1520, a snapshot of the web page corresponding to the URL is generated. Snapshot generator 706 generates a snapshot of the web page corresponding to the URL. The behavior of the web server is monitored and information returned from it is analyzed to detect if the web page URL is associated with an error. The error may be, for example, an HTTP 404 error, an HTTP 403 error, or a connection timeout error. If the web page URL is associated with an error, snapshot generation may be retried a predetermined number of times. All errors are handled by failure handler 708. If continuous errors are detected or if snapshot generation continues to fail, failure handler 708 transmits the web page URL to failed repository 902 for storage. Web page URLs stored in failed repository 902 may be periodically re-input to reattempt snapshot generation.

At 1530, a plurality of features is extracted from the snapshot. Feature extractor 710 is responsible for extracting features from the snapshot. Certain features of the snapshot and the web page URL associated with the snapshot are extracted. Features to be extracted for testing include the web page title, snapshot file size, and color distribution information of the snapshot. If the web page title and the snapshot file size do not indicate an error, then the color distribution information of the snapshot is analyzed. In order to analyze the snapshot to extract features, the snapshot may be partitioned into a plurality of grids. Features may then be determined based on a color distribution of each of the plurality of grids.

At 1540, a determination is made regarding whether the snapshot is a high quality snapshot based on the plurality of extracted features of the snapshot. Testing unit 712 uses trained model 714 to analyze the plurality of extracted features of the snapshot to compare with features of trained model 714 in determining whether the snapshot is a high quality snapshot. If the snapshot is determined to be a high quality snapshot, the snapshot and corresponding web page URL are transmitted to high quality snapshot repository 904 for storage. High quality snapshot repository 904 stores the high quality snapshots so that the high quality snapshots may be retrieved and presented as search results that are both viewable and actionable. If the snapshot Is not determined to be a high quality, then the snapshot and web page URL are transmitted to failed snapshot repository 902.

At 1550, the snapshot may be provided as a viewable and actionable link to the URL that the snapshot corresponds to. This is done in response to receiving a search query from a search engine. For example, a search engine may receive a query for "faces," and thus all results relating to "faces," which may include the snapshot, are provided to the search engine to present to a user device. The user device may then view and/or activate the snapshot since the snapshot is a viewable and actionable link to a URL.

Figure 16:
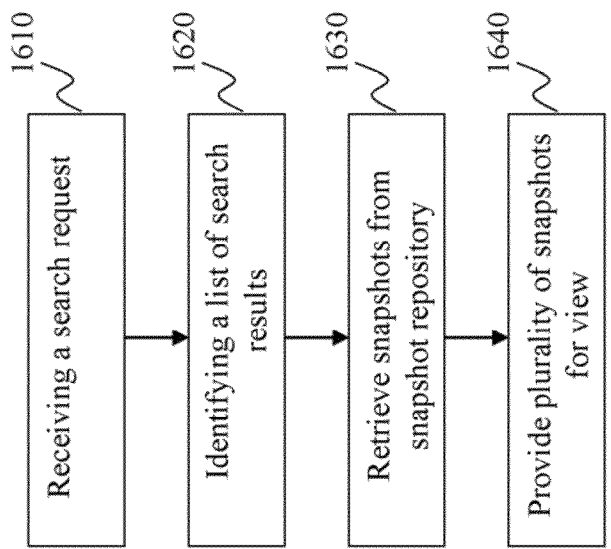
FIG. 16 depicts a flowchart of an exemplary process in which a search engine provides viewable and actionable snapshots in accordance with an embodiment of the present disclosure.

FIG. 16 depicts a flowchart of an exemplary process in which a search engine provides viewable and actionable snapshots in accordance with an embodiment of the present disclosure. At 1610, a search request is received by the search engine. The search request may represent, for example, any text entered so far by user (or a rewritten form of it) from a computational device through a web browser or a searching application. A list of web page results is associated with the search request.

At 1620, a list of search results associated with the search request is identified. The search results are ranked according to their relevance to the search request.

At 1630, the search engine retrieves snapshots associated with the search results from a snapshot repository. As each snapshot is associated with a web page URL, the snapshots are retrieved to be presented as search results to the user device.

At 1640, the snapshots are provided for view at the user device. The snapshots are viewable and actionable, and provided to the user device as search results. Since the snapshots have been retrieved from a snapshot repository such as high quality snapshot repository 904, the search results furnished to the user in the form of snapshots will represent the highest quality snapshots of relevant web pages corresponding to the user's search result.

Figure 17:
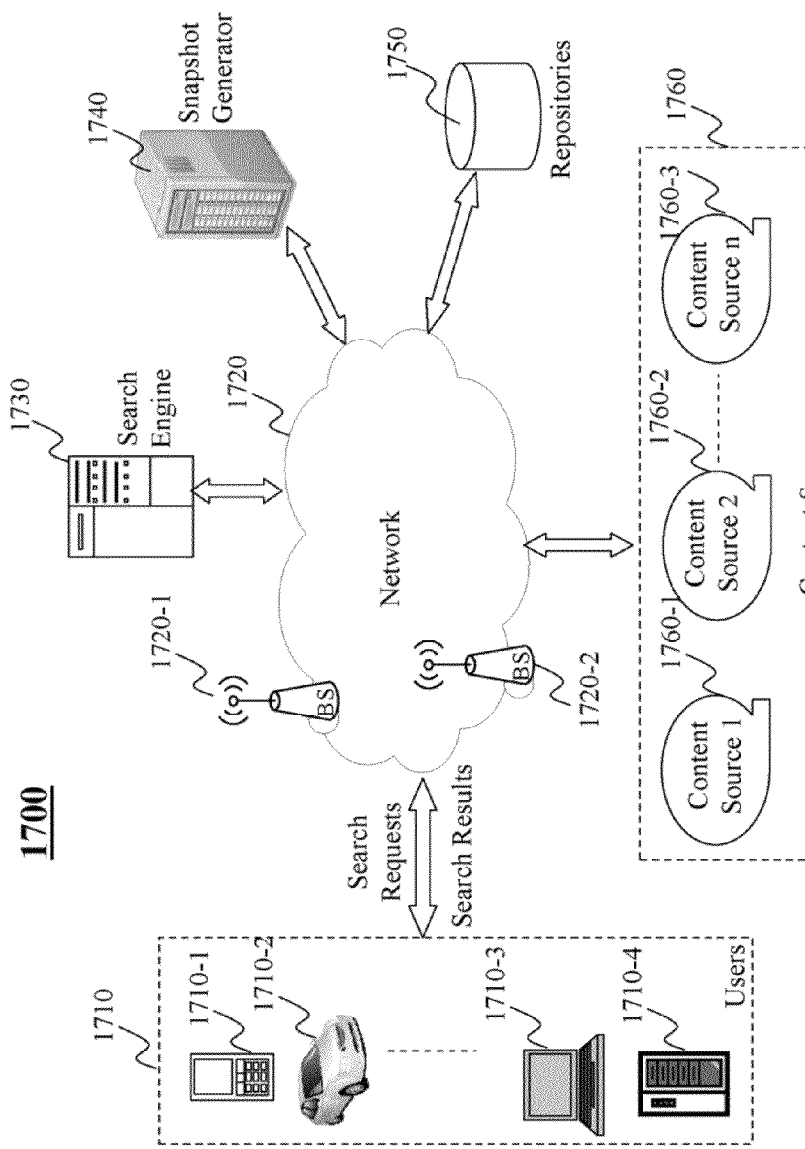
FIG. 17 is a high level depiction of an exemplary system 1700 in which a search engine and snapshot generator is deployed to provide evaluation of web page snapshot quality and high quality snapshots of web pages, in accordance with an embodiment of the present disclosure.

FIG. 17 is a high level depiction of an exemplary system 1700 in which a search engine and snapshot generator is deployed to provide evaluation of web page snapshot quality and high quality snapshots of web pages, in accordance with an embodiment of the present disclosure. Exemplary system 1700 includes users 1710, network 1720, search engine 1730, content sources 1760, snapshot generator 1740, and repositories 1750. Network 1720 can be a single network or a combination of different networks. For example, a network may be a local area network (LAN), a wide area network (WAN), a public network, a private network, a proprietary network, a Public Telephone Switched Network (PTSN), the Internet, a wireless network, a virtual network, or any combination thereof. A network may also include various network access points, e.g., wired or wireless access points such as base stations or Internet exchange points 1720-1, . . . , 1720-2, through which a data source may connect to in order to transmit information via the network.

Users 1710 may be of different types such as users connected to the network via desktop connections (1710-4), users connecting to the network via wireless connections such as through a laptop (1710-3), a handheld device (1710-1), or a built-in device in a motor vehicle (1710-2). A user may run applications and data provided by search engine 1730, snapshot generator 1740, or any of content sources 1760. Thus, applications and data may be provided from search engine 1730, snapshot generator 1740, or any of content sources 1760 through network 1720. Once a user is running an application on any aforementioned device, the user may send instructions or search requests via the application to search engine 1730, snapshot generator 1740, or any of content sources 1760 through network 1720. The application may also independently communicate with search engine 1730, snapshot generator 1740, or any of content sources 1760 through network 1720 as needed to ensure that the application can execute properly. Users 1710 may additionally submit search requests to search engine 1730 and snapshot generator 1740 without usage of an application. Based on the search requests, search engine 1730 and/or snapshot generator 1740 will provide search results to users 1710. The search results may be presented as web page snapshots representative of web pages, the web page snapshots being a viewable and actionable link to the web page URL associated with the web page.

The content sources 1760 include multiple content sources 1760-1, 1760-2, . . . , 1760-3. A content source may correspond to a web page host corresponding to an entity, whether an individual, a business, or an organization such as the USPTO represented by USPTO.gov, a content provider such as Yahoo.com, or a content feed source such as Twitter or blog pages. It is understood that any of these content sources may be associated with search results provided to users 1710. For example, a search result may include a snapshot linking to a content source. When a user activates the snapshot, the user will then be provided with a web browser view of the web page of the content source. Search engine 1730 and snapshot repository 1740 may access information from any of content sources 1760 and rely on such information to generate web page snapshots, respond to search requests, and provide search results. Search engine 1730 and snapshot generator 1740 may also access additional information, via network 1720, stored in repositories 1750, which may contain a snapshot repository including high quality snapshots that have been generated and deemed worthy of presentation as search results, as well as a failed URL repository which lists web page URLs whose snapshots failed to be generated, or whose generated snapshots did not meet a high quality threshold to be stored in snapshot repository.

In exemplary system 1700, snapshots are evaluated at snapshot generator 1740. The snapshots generated by snapshot generator 1740 may be stored in repositories 1750. High quality snapshots that are stored in repositories 1750 may be used by search engine 1730 to display as viewable and actionable links to their corresponding web page URLs. These snapshots essentially represent search results in response to user search queries. Thus, users 1710 will only be provided with high quality snapshots of original web pages as search results.

Figure 18:
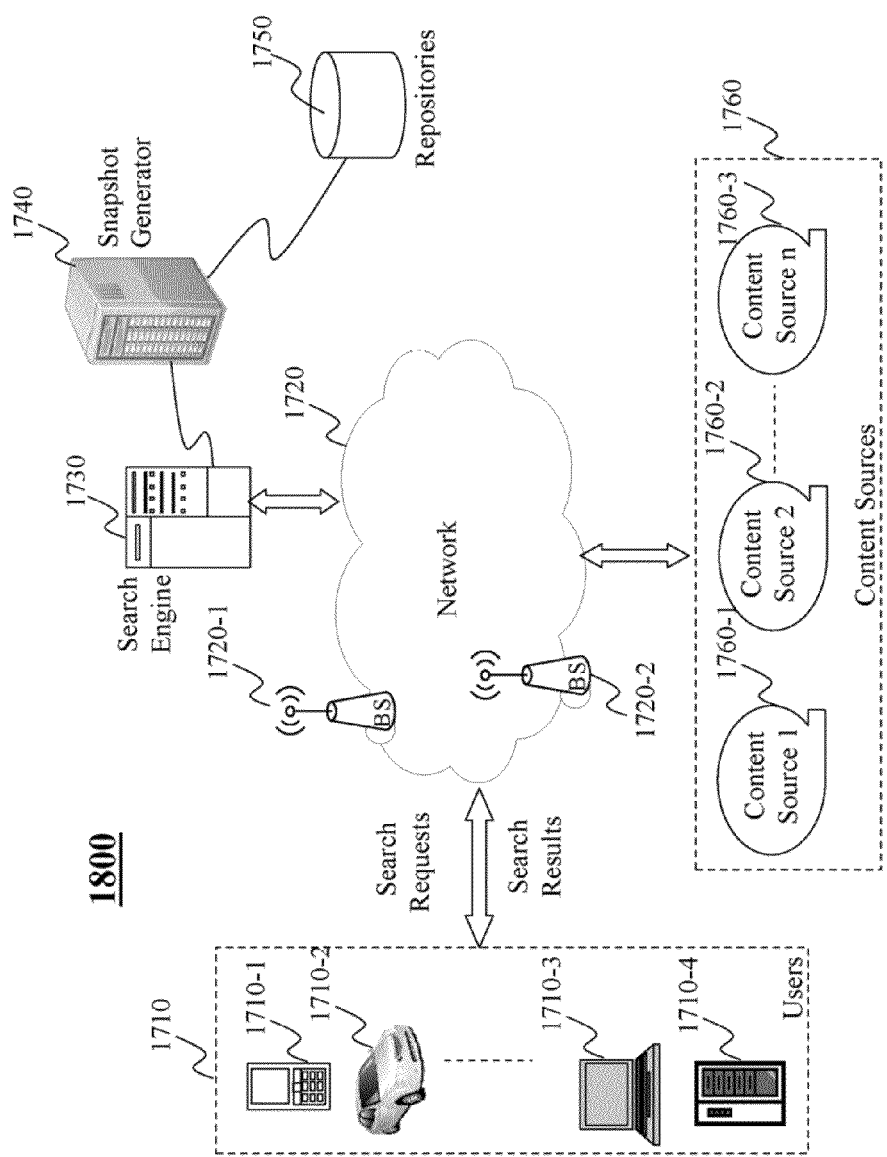
FIG. 18 is a high level depiction of an exemplary system 1800 in which a search engine and snapshot generator is deployed to provide evaluation of web page snapshot quality and high quality snapshots of web pages, in accordance with an embodiment of the present disclosure.

FIG. 18 is a high level depiction of an exemplary system 1800 in which a search engine and snapshot generator are deployed to provide evaluation of web page snapshot quality and high quality snapshots of web pages, in accordance with an embodiment of the present disclosure. In this embodiment, snapshot generator 1740 serves as a backend system of search engine 1730. All communication to and from snapshot generator 1740 are sent and received through search engine 1730.

To implement the embodiments set forth herein, computer hardware platforms may be used as hardware platform(s) for one or more of the elements described herein (e.g., search engine 1730 and snapshot generator 1740, as well as any of the components of high quality snapshot generator 702 and model generator 704). The hardware elements, operating systems and programming languages of such computer hardware platforms are conventional in nature, and it is presumed that those skilled in the art are adequately familiar therewith to adapt those technologies to implement any of the elements described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment, and as a result the drawings are self-explanatory.

Figure 19:
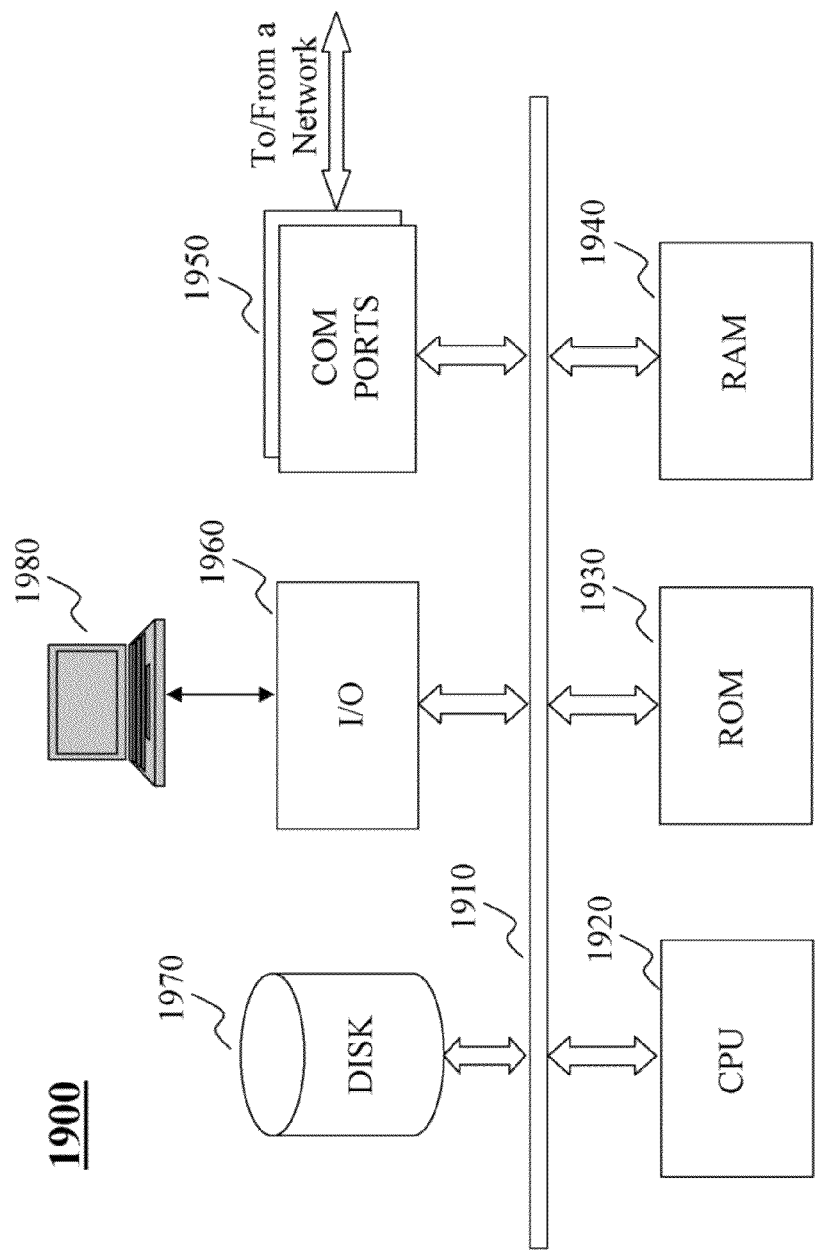
FIG. 19 depicts a general computer architecture on which the present embodiments can be implemented and has a functional block diagram illustration of a computer hardware platform which includes user interface elements.

FIG. 19 depicts a general computer architecture on which the present embodiments can be implemented and has a functional block diagram illustration of a computer hardware platform which includes user interface elements. The computer may be a general purpose computer or a special purpose computer. This computer 1900 can be used to implement any components of the development and hosting platform described herein. For example, the snapshot generator 1740 or high quality snapshot generator 702 that generates high quality snapshots of web pages, search engine 1730 which provides viewable and actionable snapshots as search results, and model generator 704 which generates a trained model for use in determining which snapshots are high quality can all be implemented on a computer such as computer 1900, via its hardware, software program, firmware, or a combination thereof. Although only one such computer is shown, for convenience, the computer functions relating to development and hosting of applications may be implemented in a distributed fashion on a number of similar platforms, to distribute the processing load.

The computer 1900, for example, includes COM ports 1950 connected to and from a network connected thereto to facilitate data communications. The computer 1900 also includes a central processing unit (CPU) 1920, in the form of one or more processors, for executing program instructions. The exemplary computer platform includes an internal communication bus 1910, program storage and data storage of different forms, e.g., disk 1970, read only memory (ROM) 1930, or random access memory (RAM) 1940, for various data files to be processed and/or communicated by the computer, as well as possibly program instructions to be executed by the CPU. The computer 1900 also includes an I/O component 1960, supporting input/output flows between the computer and other components therein such as user interface elements 1980. The computer 1900 may also receive programming and data via network communications.

Hence, aspects of the methods of developing, deploying, and hosting applications that are interoperable across a plurality of device platforms, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated schedules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media includes dynamic memory, such as a main memory of such a computer platform. Tangible transmission media includes coaxial cables, copper wire, and fiber optics, including wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic take, any other magnetic medium, a CD-ROM, DVD or DVD-ROM, any other optical media, punch card paper tapes, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the embodiments of the present disclosure are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as firmware, a firmware/software combination, a firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method implemented on at least one computing device, each computing device having at least one processor, storage, and a communication platform connected to a network for providing web page snapshots, the method comprising:
   receiving a URL;
   generating a snapshot of the web page associated with the URL;
   extracting a plurality of features from the snapshot;
   determining quality of the snapshot based on the plurality of extracted features of the snapshot in accordance with a model that is established based on previous evaluation on a plurality of snapshots; and
   associating, if the snapshot is of acceptable quality, the snapshot with the URL as a viewable and actionable representation of the URL.

2. The method of claim 1, wherein the generating a snapshot comprises:
   detecting whether the web page associated with the URL includes an error; and
   storing the URL in a failed URL database if the web page associated with the URL includes an error.

3. The method of claim 1, wherein the extracting comprises:
   analyzing the snapshot to extract features related to a color distribution of the snapshot; and analyzing the source code of web page and its snapshot to extract features related to a web page title and snapshot size of the snapshot.

4. The method of claim 3, wherein the analyzing the snapshot comprises:
partitioning the snapshot into a plurality of grids; and
determining features based on a color distribution of at least one of the plurality of grids.

5. The method of claim 4, wherein the determining features based on a color distribution comprises:
determining feature combinations of adjacent grids of the plurality of grids.

6. The method of claim 1 further comprising: generating the model by:
receiving the training data;
extracting features from the training data;
scoring the extracted features to generate a training feature set; and
generating the model using the training feature set.

7. A machine readable non-transitory and tangible medium having information recorded for providing web page snapshots, wherein the information, when read by the machine, causes the machine to perform the steps comprising:
receiving a URL;
generating a snapshot of the web page associated with the URL;
extracting a plurality of features from the snapshot;
extracting a plurality of features from the source of the web page associated with the URL;
determining quality of the snapshot based on the plurality of extracted features of the snapshot in accordance with a model that is established based on previous evaluation on a plurality of snapshots; and
associating, if the snapshot is of acceptable quality, the snapshot with the URL as a viewable and actionable representation of the URL.

8. The machine readable non-transitory and tangible medium of claim 7, wherein the generating a snapshot comprises:
detecting whether the web page associated with the URL includes an error; and
storing the URL in a failed URL database if the web page associated with the URL includes an error.

9. The machine readable non-transitory and tangible medium of claim 7, wherein the extracting comprises:
analyzing the snapshot to extract features related to a color distribution of the snapshot; and
analyzing the snapshot to extract features related to a web page title and snapshot size of the snapshot.

10. The machine readable non-transitory and tangible medium of claim 9, wherein the analyzing the snapshot comprises:
partitioning the snapshot into a plurality of grids; and
determining features based on a color distribution of at least one of the plurality of grids.

11. The machine readable non-transitory and tangible medium of claim 10, wherein the determining features based on a color distribution comprises:
determining feature combinations of adjacent grids of the plurality of grids.

12. The machine readable non-transitory and tangible medium of claim 7, wherein the information, when read by the machine, causes the machine to perform the steps comprising:
generating the model by:
receiving the training data;
extracting features from the training data;
scoring the extracted features to generate a training feature set; and
generating the model using the training feature set.

13. A system for providing web page snapshots, comprising:
a snapshot generator configured for generating a snapshot of a web page associated with a received URL;
a feature extractor configured for extracting a plurality of features from the snapshot;
a testing unit configured for determining quality of the snapshot based on the plurality of extracted features of the snapshot in accordance with a model that is established based on previous evaluation on a plurality of snapshots; and
a snapshot repository configured for associating, if the snapshot is of acceptable quality, the snapshot as a viewable and actionable representation of the URL.

14. The system of claim 13, wherein the snapshot generator is further configured for detecting whether the web page associated with the URL includes an error; and storing the URL in a failed URL database if the web page associated with the URL includes an error.

15. The system of claim 13, wherein the feature extractor is further configured for analyzing the snapshot to extract features related to a color distribution of the snapshot and the snapshot's size; and analyzing the source codes of the web page to extract features related to a web page title.

16. The system of claim 15, wherein the feature extractor is further configured for partitioning the snapshot into a plurality of grids; and determining features based on a color distribution of at least one of the plurality of grids.

17. The system of claim 16, wherein the feature extractor is further configured for determining feature combinations of adjacent grids of the plurality of grids.

18. The system of claim 13 further comprising:
a model generator for generating the model by:
receiving the training data;
extracting features from the training data;
scoring the extracted features to generate a training feature set; and
generating the model using the training feature set.

* * * * *